United States Patent [19]

Zemlicka

[11] Patent Number: 5,497,036

[45] Date of Patent: Mar. 5, 1996

[54] MOTORCYCLE TERMINAL BOX ASSEMBLY

[75] Inventor: Alvin Zemlicka, Elkhart Lake, Wis.

[73] Assignee: Harley-Davidson, Milwaukee, Wis.

[21] Appl. No.: 327,052

[22] Filed: Oct. 21, 1994

[51] Int. Cl.⁶ .................. H02B 1/04; H02H 3/20
[52] U.S. Cl. ............. 307/9.1; 361/643; 361/824; 439/34
[58] Field of Search ........ 200/51 R; 174/52.1, 174/59; 439/34, 621; 307/9.1, 10.1, 112, 113; 361/110, 111, 119, 622, 626, 641, 642, 643, 652, 673, 823, 824

[56] References Cited

U.S. PATENT DOCUMENTS

| | | | |
|---|---|---|---|
| 3,772,645 | 11/1973 | Odenz | 340/65 |
| 4,386,278 | 5/1983 | Kawada | 307/9.1 |
| 4,570,078 | 2/1986 | Yashima | 307/10.1 |
| 5,353,190 | 10/1994 | Nakayama | 361/647 |
| 5,377,067 | 12/1994 | Tanaka | 361/104 |

*Primary Examiner*—Gerald P. Tolin
*Attorney, Agent, or Firm*—Michael, Best & Friedrich

[57] ABSTRACT

A junction box for a motorcycle including a receptacle and a cover which form an enclosure mounted on the motorcycle, a terminal assembly mounted in the enclosure, a plurality of circuit interrupters for interrupting a circuit upon the occurrence of a fault. The circuit interrupters are mounted on the terminal assembly for being connected respectively to a plurality of electrical circuits on the motorcycle. A first additional circuit interrupter for interrupting a circuit upon the occurrence of a fault is mounted in the enclosure for being connected to a starter relay and a second additional circuit interrupter is mounted in the enclosure for interrupting all of the electrical circuits.

6 Claims, 3 Drawing Sheets

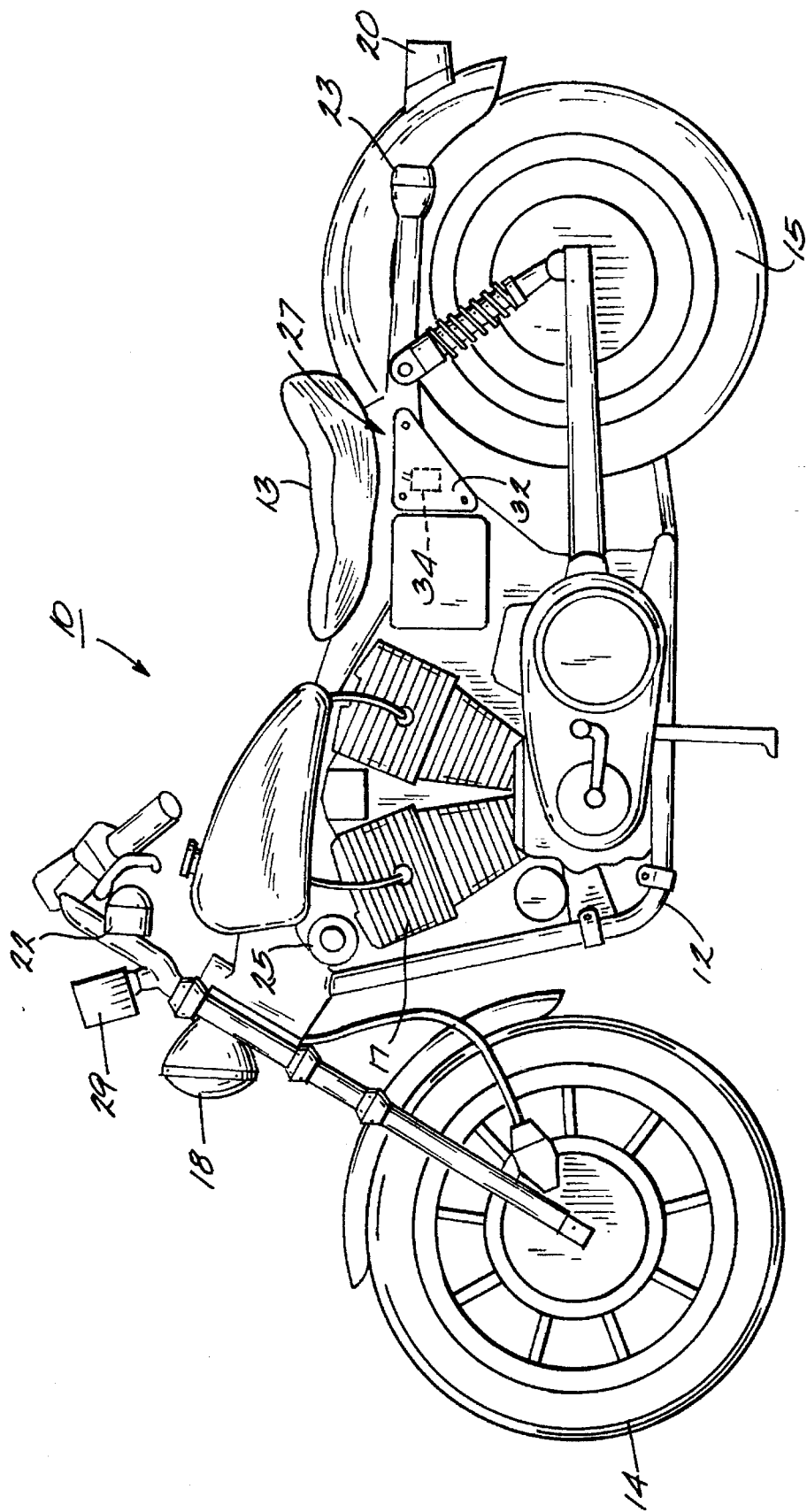

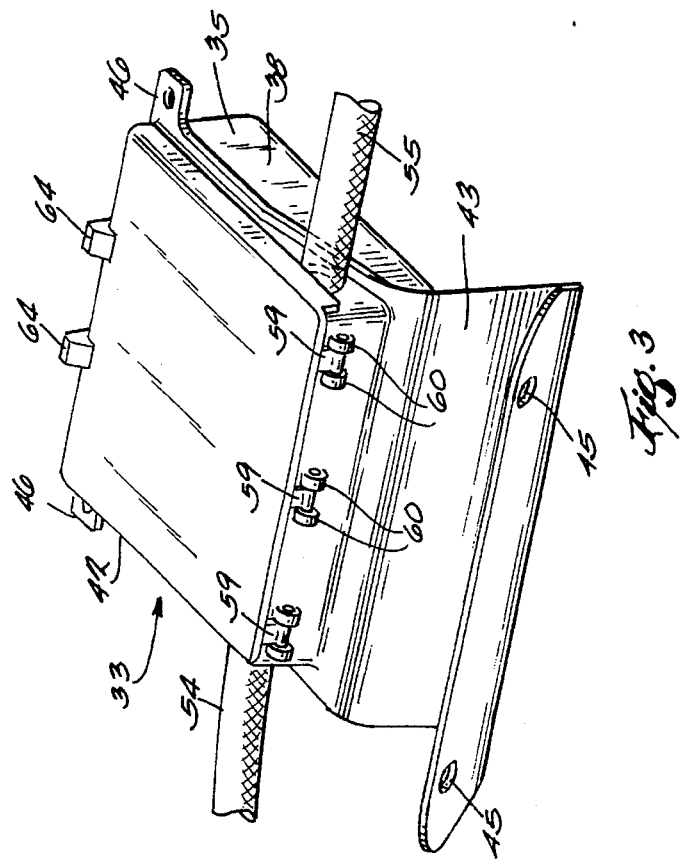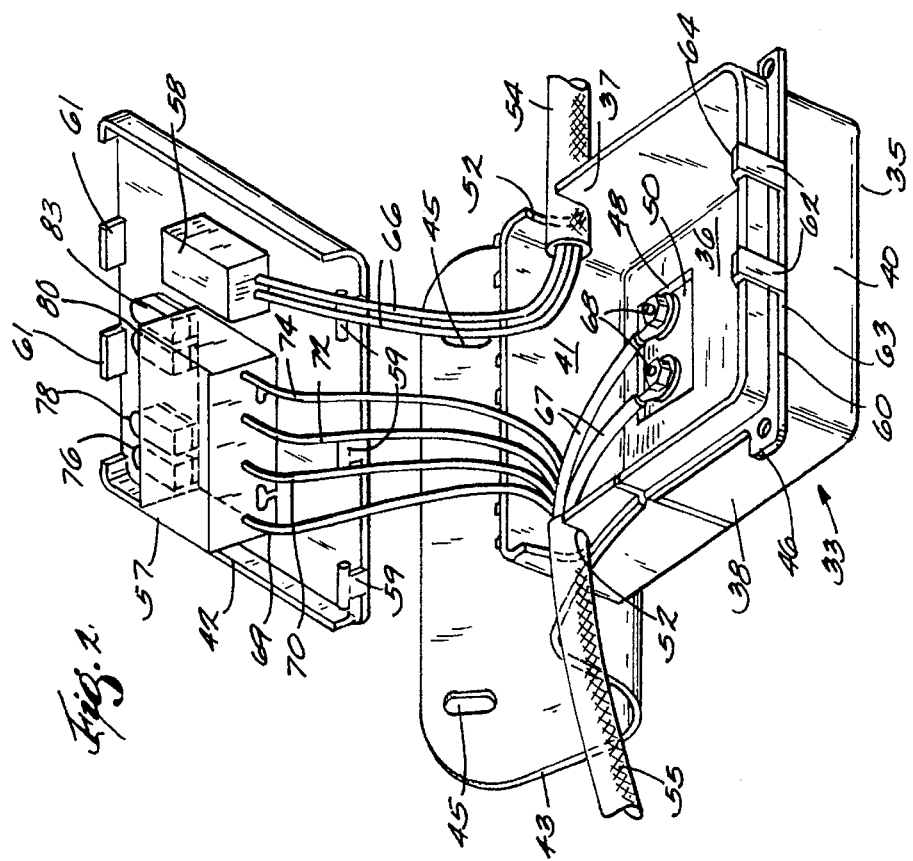

MOTORCYCLE TERMINAL BOX ASSEMBLY

BACKGROUND OF THE INVENTION

This invention relates to motorcycles and, more particularly, to a junction box for a motorcycle electrical system.

Modern motorcycles include several electrical circuits or components such as headlights and taillights, turn signals, instruments, starter relays and various accessories. Each of these circuits are normally protected by fuses or circuit breakers. In addition, there is a main circuit breaker for protecting the entire electrical system. In some prior art motorcycles, these circuit breakers and fuses are separately mounted on the vehicle which made service and maintenance more difficult.

SUMMARY OF THE INVENTION

It is the general object of the invention to provide a new and improved electrical junction box for motorcycles.

Another object of the invention is to provide an electrical junction box for motorcycles which facilitates service and maintenance.

A further object of the invention is to provide an electrical junction box for motorcycles in which all fuses and circuit breakers are readily accessible.

In general terms the invention comprises a junction box for a motorcycle having a frame, a plurality of electrical components mounted on the frame, a plurality of electrical circuits connected respectively to the electrical components. The junction box includes a receptacle and a cover which form an enclosure mounted on the motorcycle. A terminal assembly is mounted in the enclosure and a plurality of circuit interrupting means for interrupting a circuit upon the occurrence of a fault are mounted on the terminal assembly for being connected respectively to a plurality of electrical circuits on the motorcycle. A first additional circuit interrupting means for interrupting a circuit upon the occurrence of a fault is mounted in the enclosure for being connected to a separate one of the electrical circuits; a second additional circuit interrupting means is mounted in the enclosure and is connected to interrupt all of the circuits.

BRIEF DESCRIPTION OF THE DRAWINGS

FIG. 1 shows a motorcycle in which the junction box, according to the preferred embodiment of the invention, may be employed;

FIG. 2 is an exploded perspective view showing the junction box according to the preferred embodiment of the invention; and FIG. 3 is a perspective view of the junction box according to the invention with the cover closed.

DETAILED DESCRIPTION OF THE PREFERRED EMBODIMENT

Figure 4:
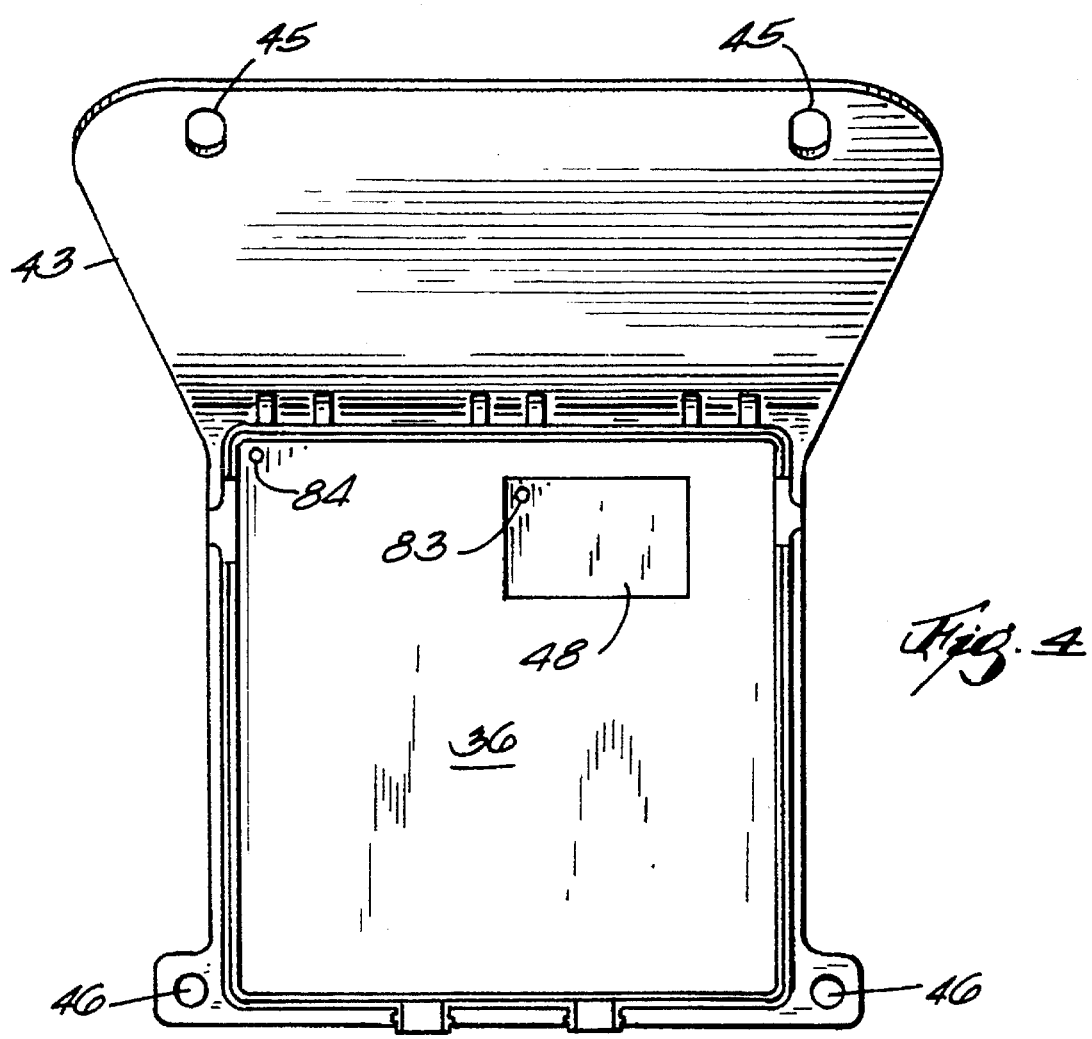
FIG. 4 is a bottom view of the junction box shown in FIG. 2.

FIG. 1 shows a motorcycle 10 having conventional components such as a frame 12, a seat 13, front and real wheels 14 and 15, and an engine 17. In addition, motorcycle 10 includes various electrical components such as a headlight 18, a taillight 20, turn signals 22 and 23, a horn 25, and ignition module 27, a speedometer 29 in addition to other instruments and accessories.

The ignition module 27 is mounted on the frame 12 beneath the seat 13 and is normally covered by an outer coverplate 32. Below the plate 32, there is a junction box 33, according to the preferred embodiment of the invention. A starter relay 34 and various ignition components are mounted on the frame behind the junction box 33.

The junction box 33 is shown in FIGS. 2 and 3 to be generally rectangular and to include a receptacle 35 defined by a bottom wall 36, side walls 37 and 38, a front wall 40, a rear wall 41 and a cover 42. The receptacle 35 and the cover 42 define an enclosure. An integral, relatively thin mounting member 43 which is curvilinear in cross section extends downwardly and then upwardly and outwardly from the rear wall 41 and has a pair of spaced-apart, oblong mounting holes 45 for securing the junction box 33 to the frame 12. A pair of apertured ears 46 extend laterally from the intersection of the side walls 37 and 38 and the front wall 40 for securing the front portion of the junction box 33 to frame 11.

A rectangular well 48 is formed in the bottom 36 for receiving the main circuit breaker 50 which is operative to disconnect the entire electrical system from the power source in the event of a short circuit or other fault. In addition, cutouts 52 are formed in each of the side walls 37 and 38 adjacent to the rear wall 41 for receiving electrical cables 54 and 55. Suitably mounted on the inside surface of cover 42 is a terminal block 57 and a starter relay circuit breaker 58.

The cover 42 is pivotally mounted on the rear wall 41 by means of hinge members 59 and 60. The cover may be held in a closed position by means of a pair of fingers 61 extended downwardly from the edge of the cover opposite the hinge members 57. Fingers 61 are receivable behind a pair of locking members 62, extending upwardly from a flange 63 which extends around the front and side walls 40, 37 and 38. The locking members 62 are spaced from the front wall 40 and each has a hook 64 formed at its upper end and which extends over the upper surface 65 of the cover 37 for resiliently holding the cover in a closed position.

The cable 54 includes conductors 66 which form a part of the starter relay circuit and are connected to the starter relay circuit breaker 58. The cable 55 has a first pair of conductors 67 which are connected to terminals 68 on the main circuit breaker 50 and pairs of conductors 69, 70, 72, and 74 which are connected to the terminal block 57. Mounted on the opposite end of the terminal block 57 and connected respectively to the conductors 69, 70, 72 and 74 are an ignition circuit breaker 76, an instrument circuit breaker 78, a third circuit breaker 80 connected to a lighting circuit which includes the headlight 18, the taillight 20, and the turn signals 22, 23 and a fourth circuit breaker 82 which is in circuit with the various accessories such as the horn 25. The term circuit breaker as used herein is intended to mean either a mechanical circuit interrupter or a fuse.

If electrical servicing or maintenance is required, or if a circuit breaker must be reset or replaced, this can be accomplished readily by removing the outer coverplate 32 and pivoting the cover 42 of the junction box 34 to its open position. This exposes all of the circuit breakers 50, 58, 76, 78, 80 and 82.

The junction box 33 also serves to protect the circuit breakers 50, 58, 76, 78 and 80 from rain, splash and spray during operation and wash water. In addition, a first drain hole 83 in the lower surface of the well 48 and a second drain 84 in one corner of the bottom wall 36 at the lowest point of the junction box 33. This permits any moisture which may collect in the junction box to drain away.

While only a single embodiment of the invention has been illustrated and described, it is not intended to be limited thereby, but only by the scope of the appended claims.

I claim:

1. A junction box for a motorcycle having a frame, a plurality of electrical components mounted on said frame, a plurality of electrical circuits connected respectively to said electrical components, said junction box including a receptacle and a cover mounted on said receptacle to form an enclosure, said cover being movable between open and closed positions relative to said receptacle and having an outer surface and an inner surface facing said enclosure, a terminal assembly mounted on the inner surface of said cover, means for mounting said junction box on the motorcycle, a plurality of circuit interrupting means for interrupting a circuit upon the occurrence of a fault, said plurality of circuit interrupting means being mounted on said terminal assembly and each being adapted to be connected respectively to one of plurality of electrical circuits, a first additional circuit interrupting means for interrupting a circuit upon the occurrence of a fault and being mounted in said enclosure and being connected to a separate one of said additional plurality of electrical circuits, a second additional circuit interrupting means mounted in said enclosure and being connected to interrupt all of said electrical circuits, at least one of said first and second additional circuit interrupting means being mounted on the inner surface of said cover and the remaining circuit interrupting means being mounted in said receptacle.

2. The junction box set forth in claim 1 wherein means are formed in said receptacle for defining a recess, said first additional circuit interrupting means is mounted on the inner surface of said cover and the second additional circuit interrupting means is mounted in said recess.

3. The junction box set forth in claim 2 wherein said cover is pivotally mounted on said receptacle and including means for releasably and resiliently holding said cover in a closed position relative to said receptacle, said terminal assembly and all of said circuit interrupting means being disposed within said enclosure when said cover is closed and being exposed when said cover is open.

4. The junction box set forth in claim 3 wherein one of said electrical components comprise a starter relay, said first additional circuit interrupting means being connected to said starter relay.

5. The junction box set forth in claim 4 wherein said plurality of electrical components comprise motorcycle accessories, motorcycle lights, motorcycle instruments and an ignition, said circuit interrupting means being respectively connected to said motorcycle accessories, said motorcycle lights, said motorcycle instruments and said ignition.

6. The junction box set forth in claim 5 and including at least one drain hole formed in said junction box.

* * * * *